United States Patent [19]

Glass et al.

[11] Patent Number: 4,796,110

[45] Date of Patent: Jan. 3, 1989

[54] SYSTEM AND METHOD FOR ENCODING AND STORING DIGITAL INFORMATION ON MAGNETIC TAPE

[75] Inventors: Edward N. Glass; Wayne Stark, both of Ann Arbor, Mich.

[73] Assignee: Irwin Magnetic Systems, Inc., Ann Arbor, Mich.

[21] Appl. No.: 830,559

[22] Filed: Feb. 18, 1986

[51] Int. Cl.$^4$ .................. G11B 5/09; H03M 13/00
[52] U.S. Cl. .......................... 360/53; 371/39
[58] Field of Search ............... 360/47, 48, 53; 371/2, 371/38, 39, 40, 44, 45, 48, 37

[56] References Cited

U.S. PATENT DOCUMENTS

| | | | |
|---|---|---|---|
| 3,745,528 | 12/1971 | Patel | 371/38 |
| 3,911,402 | 10/1975 | McLeau et al. | 364/200 |
| 4,413,339 | 11/1983 | Riggle et al. | 371/38 |
| 4,468,712 | 9/1984 | Mueller et al. | 360/106 |
| 4,472,750 | 9/1984 | Klumpp et al. | 360/78 |
| 4,593,394 | 6/1986 | Tomimitsu | 371/38 |
| 4,607,367 | 8/1986 | Ive et al. | 371/38 |
| 4,637,021 | 1/1987 | Shewrow | 371/37 |
| 4,646,303 | 2/1987 | Narusawa et al. | 371/38 |

OTHER PUBLICATIONS

Reed, *Polynomial Codes Over Certain Finite Fields*, 8 J. Soc. Indust. Appl. Math. 300 (1960).
Blahut, *Theory and Practice of Error Control Codes*, pp. 174-175 (Addison-Wesley 1983).
Technical Support Package on Modular VLSI Reed-Solomon Decoder for Fall 1985, NASA Tech Brief vol. 9, No. 3, Item #51 from Jet Propulsion Laboratory Invention Report NPO-15837/5292 (Sep. 1985).
Technical Support Package on Fast Reed-Solomon Decoder for Fall 1985, NASA Tech Brief vol. 9, No. 3, Item #34 from Jet Propulsion Laboratory Invention Report NPO-15867/5326 (Sep. 1985).
Technical Support Package on Systolic VLSI Reed-Solomon Decoder for Fall 1985, NASA Tech Brief vol. 9, No. 3, Item #110 from Jet Propulsion Laboratory Invention Report NPO-16383/5857 (Sep. 1985).

*Primary Examiner*—Vincent P. Canney
*Attorney, Agent, or Firm*—Price, Heneveld, Cooper DeWitt & Litton

[57] ABSTRACT

The specification discloses a system and method for storing digital information on a magnetic tape wherein redundant information is generated and also stored so that subsequently unreadable portions of the tape can be regenerated based on the readable portions. The tape is formatted to include a plurality of sequentially arranged blocks, each including a plurality of generally identical data sectors and error-correction sectors. The placement of the data sectors and the associated error-correction sectors within a common block facilitates, and increases the speed of, tape writes and reads. Preferably, a Reed-Solomon code is utilized to generate the redundant information in the error-correction sectors as a preferred balance between recoverability, tape overhead, and speed of encoding.

20 Claims, 6 Drawing Sheets

PHYSICAL TAPE FORMAT

FIG. 2 PHYSICAL TAPE FORMAT

SYSTEM AND METHOD FOR ENCODING AND STORING DIGITAL INFORMATION ON MAGNETIC TAPE

BACKGROUND OF THE INVENTION

The present invention relates to systems and methods for writing digital information on magnetic tapes, and more particularly to such systems and methods for generating and storing redundant information with the digital information on the tape.

A wide variety of storage devices has been developed for storing digital data or information generated by, and utilized in conjunction with, a digital computer. The selection of an appropriate storage device for a particular application is dictated by several factors including the cost per byte of information stored and the read/write response time. CMOS random access memory (RAM) provides the fastest response time, but has the highest cost per byte. At the other end of the spectrum, magnetic tape has the slowest response time, but the lowest cost per byte stored. In between these two extremes are a variety of disks, which provide response time and cost per byte in between those for RAM and tape. Such disks include hard disks, "Winchester" disks, and floppy disks.

All of these storage devices are subject to information loss or garbling, which often can be catastrophic. CMOS RAM can lose its information if a circuit malfunctions or if "noise" exists on a communication bus. Information can be lost on disks, tapes, and other magnetic surfaces by a magnetic field, physical damage to the magnetic surface, or noise on the communication bus. Other causes of information loss include software which "goes haywire" or programmer/operator error. This lost information is generally referred to as "erasures". It is therefore desirable and commonly accepted within the computer industry to provide cost effective "backup" for the various memory devices. "Backup" involves periodically storing the contents of a first storage device on a second storage device, so that the contents of the first storage device can be restored or recovered in the event of damage to, or information loss from, the first storage device.

Over the evolution of memory devices, disks have acquired the largest acceptance as striking an appropriate compromise between response time and cost per byte for the large volumes of information used in conjunction with a digital computer. A variety of magnetic tape "backup" systems have been developed on which the digital information on the disk can be periodically stored or backed up. Several particularly effective tape backups are those sold as Models 110 and 310 by Irwin Magnetic Systems, Inc., of Ann Arbor, Mich., the assignee of the present application. The structure and operation of some of these systems are illustrated in U.S. patent application Ser. No. 589,007, filed Mar. 13, 1984, by Chambors et al, entitled Method and Apparatus for Pre-Recording Tracking Information on Magnetic Media; U.S. Pat. No. 4,472,750, issued Sept. 18, 1984, to Klumpp et al., entitled Data Record with Pre-Recorded Transducer Positioning Signals, and System for Utilizing Same; and U.S. Pat. No. 4,468,712, issued Aug. 28, 1984, to Mueller et al., entitled Positioner Apparatus for Tape Recorder Heads. Although these systems constitute a significant advance and enjoy wide-spread commercial success today, the assignee of the present application has continually sought to improve the performance and efficiency of these backup systems.

In recording the backup information on the magnetic tape, it is desirable to provide redundant information to guard against loss of information on the magnetic tape. If a portion of the backup data information is lost for one reason or another, the lost information (or erasure) may be recoverable from the redundant information. One approach is to record two complete copies of the disk contents on the tape. Consequently, if one copy of the information is lost, the other copy can be consulted to complete the information restoration. This approach is wasteful of tape space and requires excessive time during backup. Typically, the computer cannot be utilized while the backup process is occurring; and therefore this approach is undesirably wasteful of time. A second approach is to calculate redundant information using an error-correction code. Redundant information calculated using this method typically requires less space than a complete second copy of the data information, while still enabling recovery from at least some loss of information. Typically, redundant information is stored in blocks physically separate from the data blocks; and a look-up table is provided on the tape to provide a mapping between the data blocks and the corresponding redundant blocks. This approach also has its drawbacks. If the look-up table is erased or otherwise lost, it is impossible to determine the correspondence between the data blocks and the redundant blocks required to read the redundant information and restore the data information to the disk. Additionally, both the writing and reading are undesirably slow because the mapping table must be repeatedly consulted and the various data and redundant blocks accessed at separate locations on the tape.

SUMMARY OF THE INVENTION

The aforementioned problems are overcome in the present invention wherein a system and method are provided for efficiently and rapidly calculating and storing redundant information in a magnetic tape backup unit.

In a first aspect of the invention, (1) the data information is formatted into data sectors, (2) redundant information is calculated for a group of data sectors and stored in one or more redundant sectors, and (3) the group of data sectors and the corresponding redundant sectors are written sequentially to the tape as a block of information. Preferably, the redundant sectors are written sequentially at the beginning or end of each block. This method and system have significant advantages over known backup units. First, the redundant information is interleaved with the data information in a known pattern at known locations, eliminating the need for mapping tables to correlate the data information and the redundant information. Second, the present invention operates faster than known systems because the redundant information is stored physically adjacent the data information to which it relates. It is not necessary to physically transport the tape between separate physical locations to access related data and error-correction information. This aspect of the invention greatly enhances the speed and reliability of the resultant backup system.

In a second aspect of the invention, the method includes the steps of (1) formatting the data information into groups of data words, (2) calculating one or more redundant words for each group using a Reed-Solomon code, and (3) writing the related data and redundant words to the tape as a block of backup information. Utilizing a Reed-Solomon code improves both the efficiency and the speed at which the backup system operates. First, the chosen Reed-Solomon code is a "high rate" code meaning that relatively little redundant information is required to correct a relatively large number of erasures. Second, the code is a "systematic" code meaning that the original data is unchanged during storage, so that decoding is unnecessary if erasures do not occur. Third, the redundant information can be readily encoded with a relatively fast algorithm and/or a relatively simple hardware configuration.

These and other objects, advantages, and features of the invention will be more readily understood and appreciated by reference to the detailed description of the preferred embodiment of the drawings.

DETAILED DESCRIPTION OF THE PREFERRED EMBODIMENT

I. Tape Format

The data information written to the tape from the disk will hereinafter be referred to as data words and/or data bytes. The redundant information calculated and written to the tape will hereinafter be referred to as redundant words, redundant bytes, error-correction code (ECC) words, and/or error-correction code (ECC) bytes. In the preferred embodiment, each data word or redundant word includes a single byte. The present invention is applicable to and encompasses multibyte words also. The data bytes are arranged or formatted into sectors, each of which contains 1024 (1k) bytes. For every 16 data sectors, two sectors of redundant bytes are created. Each byte in each redundant sector is a function of the corresponding bytes in the sixteen data sectors. A total of 18 sectors—sixteen data sectors and two redundant sectors—comprise a block. The format of the tape and the encoding of the redundant information comprise two aspects of the present invention.

As currently implemented, the backup system of the present invention is capable of storing 20 megabytes (20 M) of data information on a single data cartridge. The construction of the backup unit is generally well-known to those having ordinary skill in the art, for example as illustrated in the above-noted U.S. patent application No. 589,007 and U.S. Pat. Nos. 4,472,750 and 4,468,712. Such data tape drives have been manufactured and sold by the assignee of the present application as Models 110 and 310. The data cartridges are those sold as Models TC200 and TC400 by Irwin Magnetic Systems, Inc. of Ann Arbor, Mich.; those manufactured and sold as Models DC1000 and DC2000 by Minnesota Mining and Manufacturing Company of Minneapolis, Minn.; and those manufactured and sold as Models Microtape 1000 and Microtape 2000 by Data Electronics, Incorporated of San Diego, Calif.

A. Conceptual Format

Figure 1:
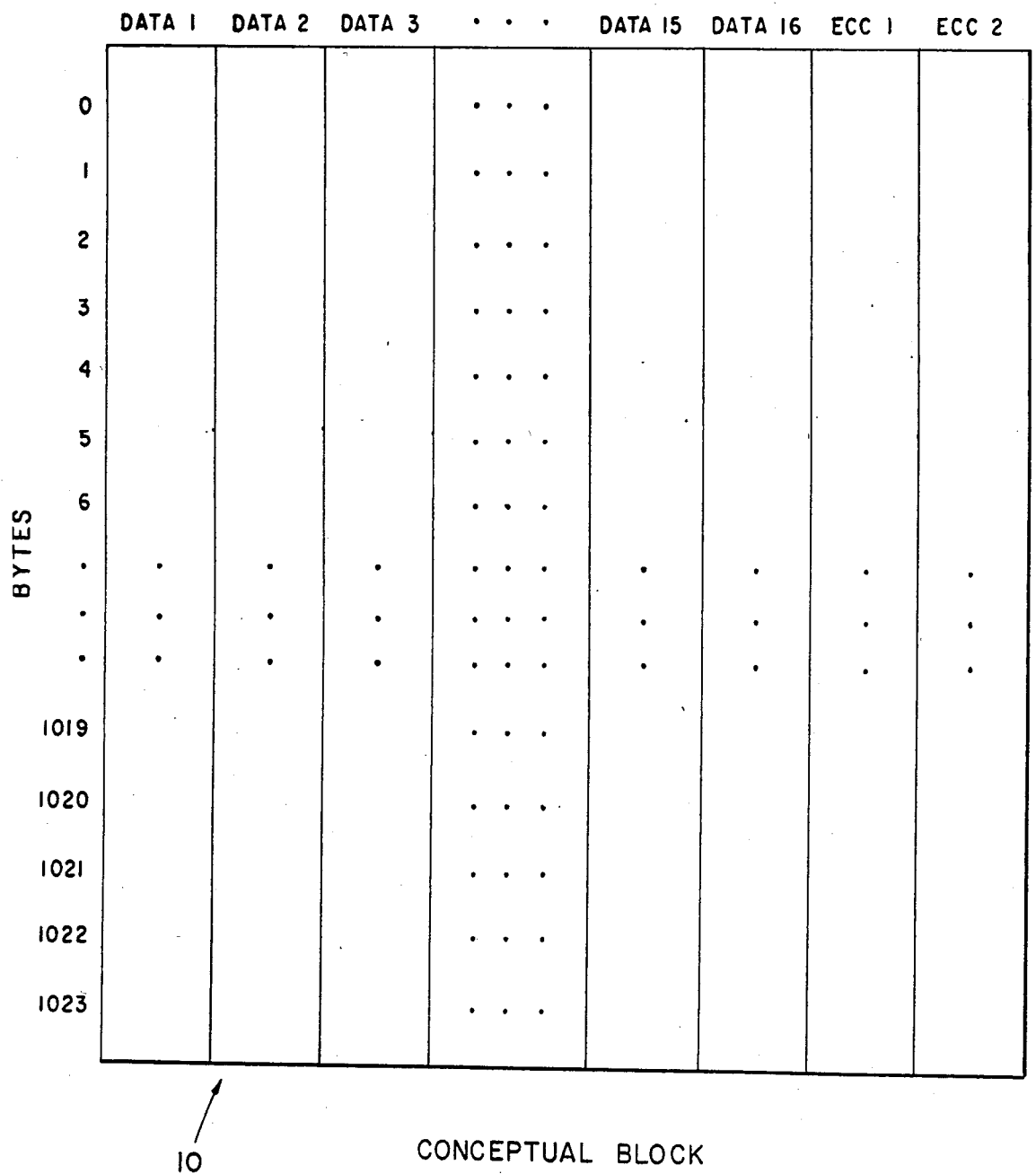
FIG. 1 shows a conceptual block of backup information including data and redundant sectors as generated by the present invention.

The conceptual format of a tape encoded utilizing the system and method of the present invention is illustrated in FIG. 1. The data information received from the disk is formatted into sectors, each of which includes 1024 8-bit bytes. Sixteen data sectors are included within each block 10 and are denoted DATA 1 through DATA 16. Consequently, each block 10 includes sixteen kilobytes of data information. The words within each sector are sequentially ordered and denominated 0-1023. As conceptually illustrated in FIG. 1, the sectors are arranged in table format with corresponding words in each sector (e.g. word 0 of each sector) arranged side by side. The bytes within each corresponding sector at a given location are hereinafter referred to as corresponding data bytes.

For each group of sixteen corresponding bytes (one byte from each of the sixteen data sectors), two redundant bytes are generated. These bytes are sequentially ordered in two sectors denoted ECC 1 and ECC 2. One byte in each of the ECC sectors corresponds to one byte in each of the sixteen data sectors and therefore to a group of sixteen corresponding data bytes.

As will be more fully described below, the two ECC sectors are generated from the sixteen data sectors utilizing a Reed-Solomon encoding scheme. Two ECC bytes are generated for each group of corresponding data bytes by "folding" the sixteen data bytes and the two ECC bytes together. Suffice it to say at this point that the two redundant bytes are of such a nature, quality, and/or quantity to enable the unique reconstruction or restoration of any two erased bytes (either data or ECC) based on the remaining sixteen bytes in the group.

B. Physical Format

Figure 2:
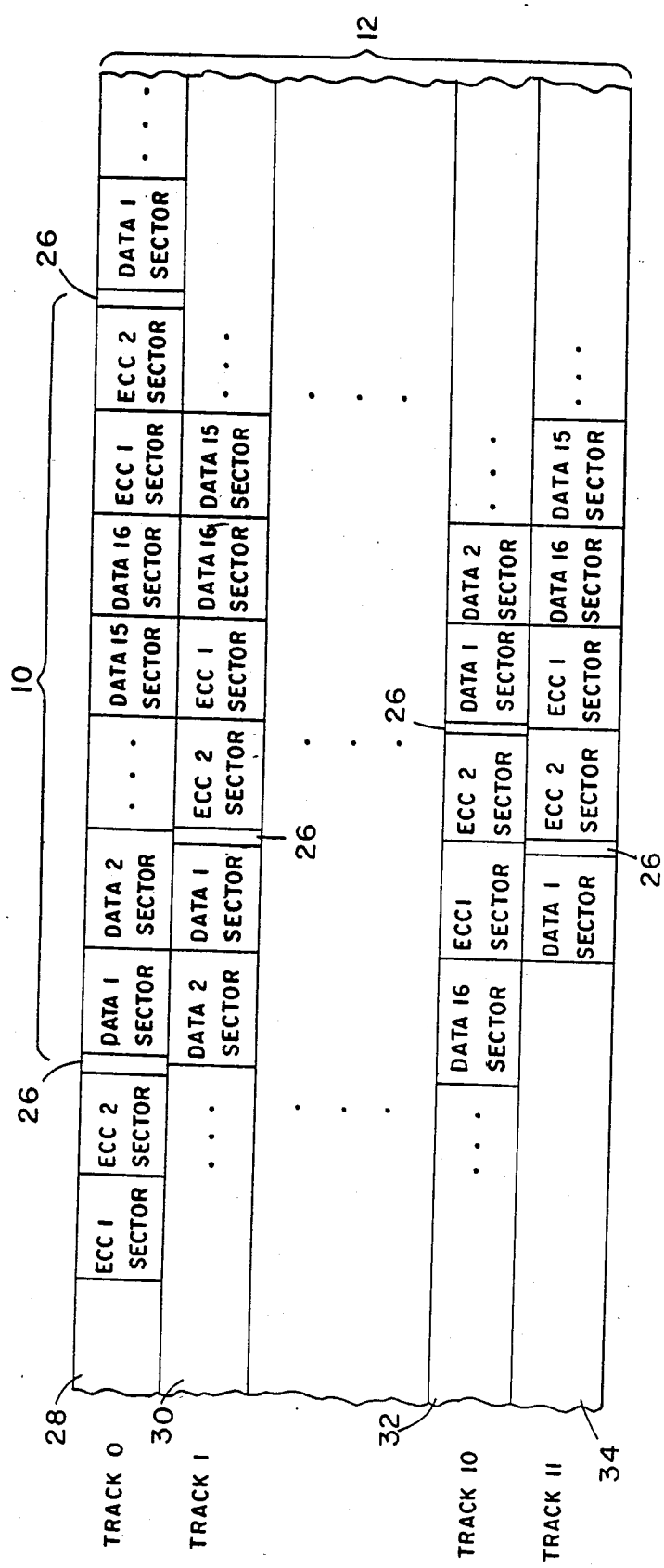
FIG. 2 shows the physical tape format of the backup blocks.

The conceptual block 10 as illustrated in FIG. 1 is generated within RAM and subsequently written to the tape 12 as illustrated in FIG. 2. All 18 sectors of the physical block are written sequentially on one track of the tape 12. Physically, the sixteen data sectors are written first followed by the two ECC sectors. The ECC sectors have the same physical location in every block. Consequently, a map is not required between the data sectors and/or the ECC sectors in order to locate and correlate this information. The 1024 bytes within each sector are written sequentially to the tape. As is routine to those having skill in the art, appropriate header information is included at the beginning of each sector; and appropriate header information is written at the beginning of each block, for example at point 26 (FIG. 2).

The tape preferably includes 12 tracks denoted track 0 through track 11 identified by designating numerals 28, 30, 32, and 34. The blocks 10 are written to the tape 12 in serpentine format. Specifically, track 0 is first filled from a first end of the tape to second end of the tape; track one is then filled from the second end of the tape to the first end of the tape; and so forth. The physical length of each sector of 1024 bytes is approximately 1 inch.

II. Encoding of Information

As briefly mentioned above, the error-correction information is generated using a Reed-Solomon code. The implementation of a Reed-Solomon code is generally well-known to those having ordinary skill in the data transmission art. The symbols or bytes of a codeword in a Reed-Solomon code are elements in a finite field known as a Galois field. In the present application, the Galois field is selected to have 256 elements because the 8-bit data bytes are capable of defining 256 different bytes. The 256-element Galois field is denoted GF(256). A Galois field is a finite set of elements with two operations, addition and multiplication, such that each element has an additive inverse and each nonzero element has a multiplicative inverse. Both operations are closed, meaning that the result of an operation performed on any two elements in the field results in a third element also in the field. All Galois fields with 256 elements are isomorphic, meaning that a one-to-one mapping exists between elements in any two such fields that preserves addition and multiplication.

The concept of a primitive root must also be mentioned at this point. A primitive root q is an element within the field such that the powers of the primitive element generate all nonzero elements in the filed. At least one primitive element exists for each Galois field.

Reed-Solomon codewords can be viewed as polynomials of degree n−1 with coefficients in GF(256), where n is the total number of symbols or bytes, both information and redundant. All Reed-Solomon codewords within a given field are multiples of a polynomial g(x) over GF(256), where g(x) is the codeword generating polynomial.

The minimum distance of a code is the minimum number of symbols in which any two codewords differ. As a general rule, if j erasures are to be corrected, the distance must be at least j+1. If two errors are to be corrected, the distance is three. The polynomial g(x) generates a Reed-Solomon code with minimum distance d if g(x) has roots $q^k, q^{k+1}, \ldots, q^{k+d-2}$ for any k. The polynomial g(x) generating a code with minimum distance d is defined as follows:

$$g(x) = \prod_{i=k}^{k+d-2} (x - q^i)$$

Based upon the information supplied by the tape manufacturer, it was decided that a reliable level of performance was to be able to correct up to two erasures in every sixteen data bytes. The probability of three erasures is too small to be dealt with on a routine basis. Indeed, in all tests conducted since the present invention was implemented, no more than two erasures has ever occurred in a single codeword. Accordingly, d in the above equation is selected to be three providing for correction of two erasures. The generator polynomial then becomes:

$$\begin{aligned} g(x) &= \prod_{i=k}^{k+1} (x - q^i) \\ &= (x - q^k)(x - q^{k+1}) \\ &= x^2 - (q^k + q^{k+1})x + q^{2k+1} \end{aligned}$$

To facilitate encoding calculations, it is desirable to have as many coefficients as possible in the above equation to be equal to one. Accordingly, the following selection is made in view of the fact that k can be arbitrary:

$$q^{2k+1} = 1$$

Therefore, the coefficient of x is the only coefficient not equal to one. In GF(256), $q^{255} = 1$ since $q^{256}$ must equal itself. Therefore, k=127. In view of this selection, the code generating polynomial is given as follows:

$$\begin{aligned} g(x) &= (x - q^{127})(x - q^{128}) \\ &= x^2 - (q^{127} + q^{128})x + q^{255} \end{aligned}$$

Within GF(256), $q^{127} + q^{128}$ equals $q^{69}$; and, as stated above, $q^{255}$ equals 1. Therefore:

$$g(x) = x^2 - q^{69}x + 1$$

In GF(256) addition and subtraction are identical to one another—namely both being exclusive ORs when elements are represented as bytes—and the above equation finally becomes:

$$g(x) = x^2 + q^{69}x + 1$$

Figure 3:
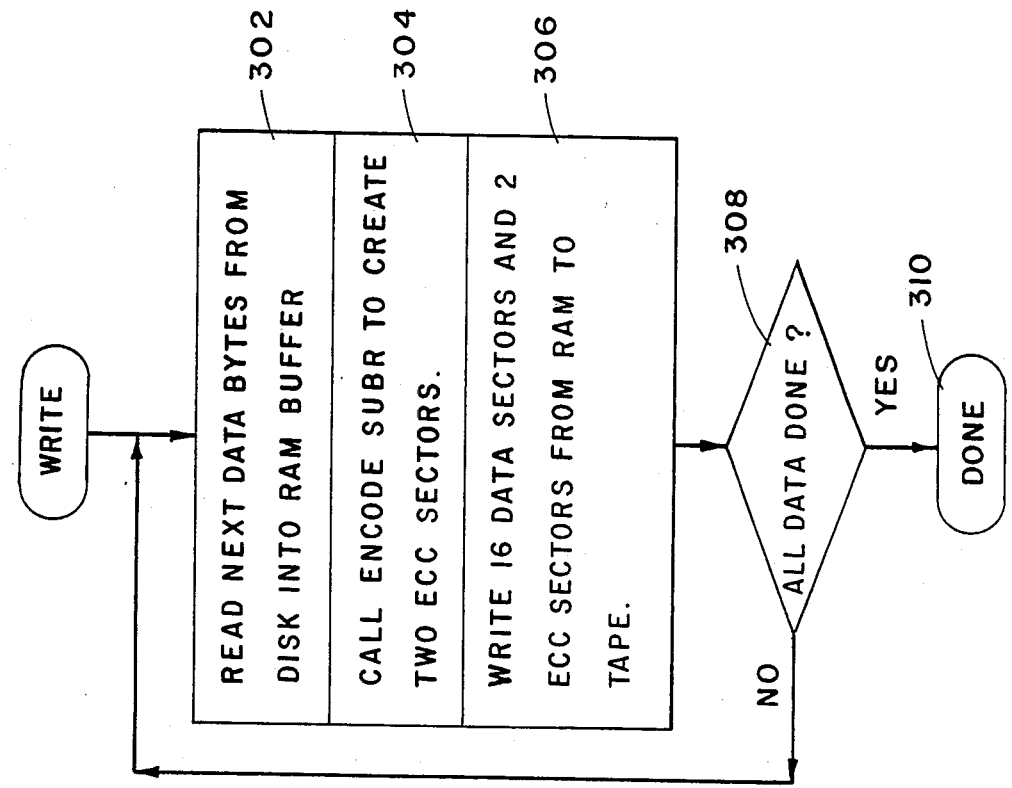
FIGS. 3-7 are flow charts showing the progam flow of the encoding and decoding software.

The software implementing the backup and restoration functions utilizing the present invention are illustrated in FIGS. 3-7. The flow chart for performing disk backup, or tape write, is illustrated in FIG. 3. Within a loop, data bytes are read 302 from the disk into the random access memory (RAM) buffer and arranged or formatted into sixteen sectors of 1024 bytes each. The ENCODE subroutine is called 304 to generate or create the two error-correction code (ECC) sectors related to or corresponding to the sixteen data sectors and placed in sectors 17 and 18 of the RAM buffer. All 18 sectors, including the sixteen data sectors and the two ECC sectors, are then written 306 from the RAM buffer onto the tape as a block 10 of information. A decision 308 is then made to determine whether all disk data has been written to the tape. If so, the backup or write function is complete 310; if not, program flow returns to block 302 wherein additional disk information is backed up onto the tape.

Figure 4:
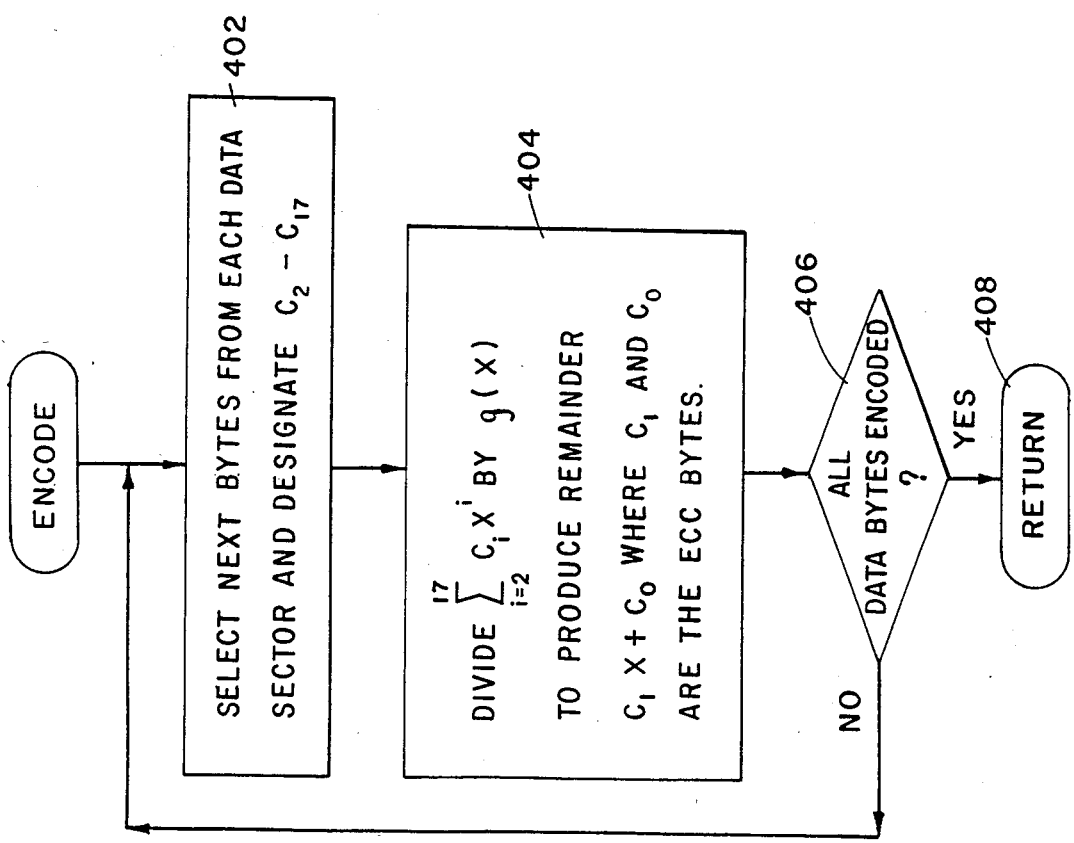

FIG. 4 illustrates the ENCODE subroutine utilized to generate the two ECC sectors based on the sixteen data sectors. Upon commencement, the next byte is selected 402 from each of the data sectors and designated $c_2$ through $c_{17}$. For example, on the first pass through the loop, the first byte is selected from each of the 16 sectors; on the second pass, the second byte is selected from each sector; and so forth. The equation:

$$\sum_{i=2}^{17} c_i x^i$$

is then divided 404 by g(x) to produce a remainder $c_1 x + c_0$. The coefficient $c_1$ and $c_0$ are the ECC bytes and are placed in order in the two ECC sectors to correspond with the sixteen data bytes. For example, on the first pass through the loop, the two ECC bytes will be placed in the first locations in the ECC sectors; on the second pass, the bytes will be placed in the second locations; and so forth. A decision 406 is made based on whether all 1024 data bytes in the sectors have been encoded. If so, control returns 408 to the WRITE routine; if not, flow returns to block 402 wherein the next bytes in each of the sectors are encoded.

III. Decoding of Information

Figure 5:
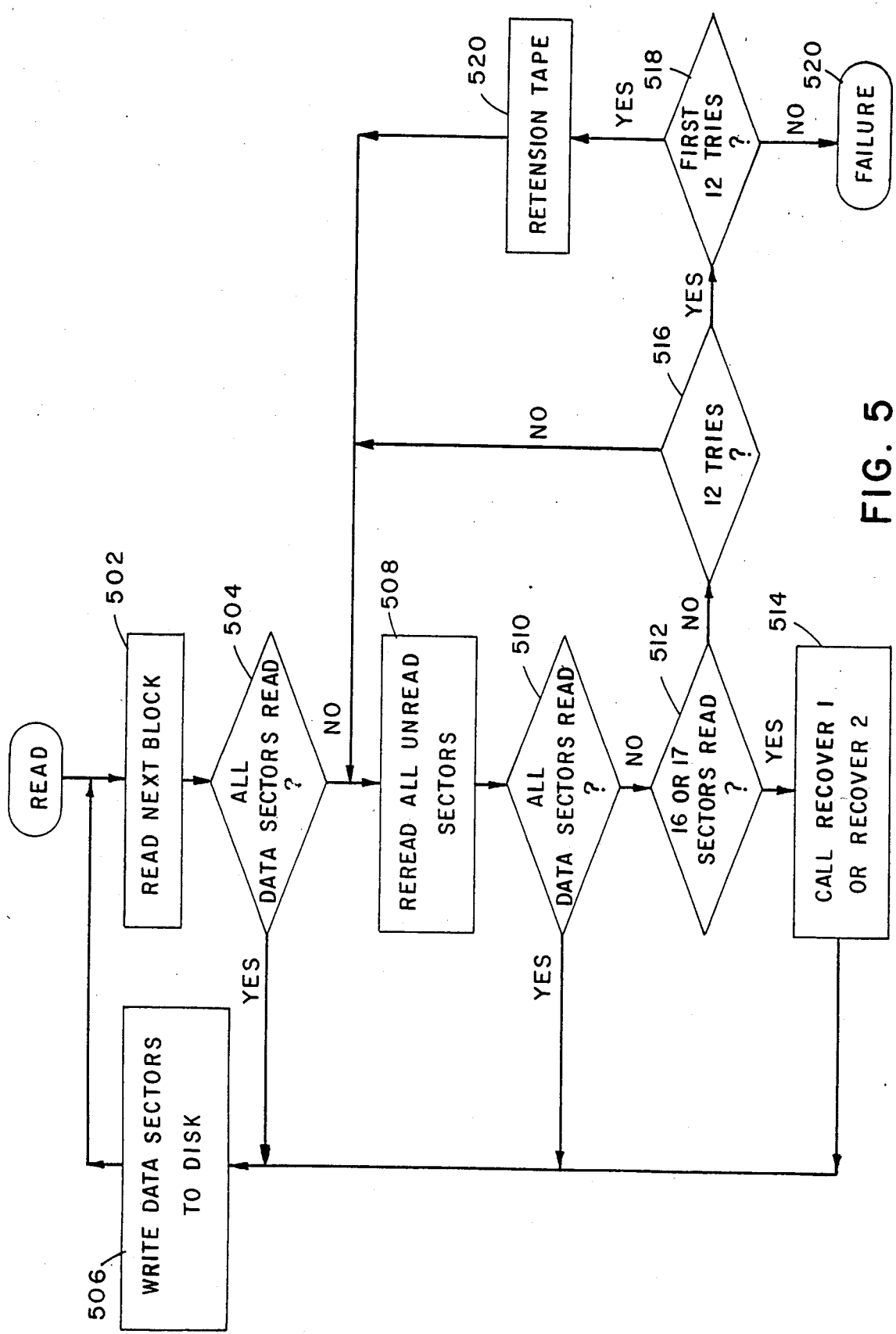
Figure 6:
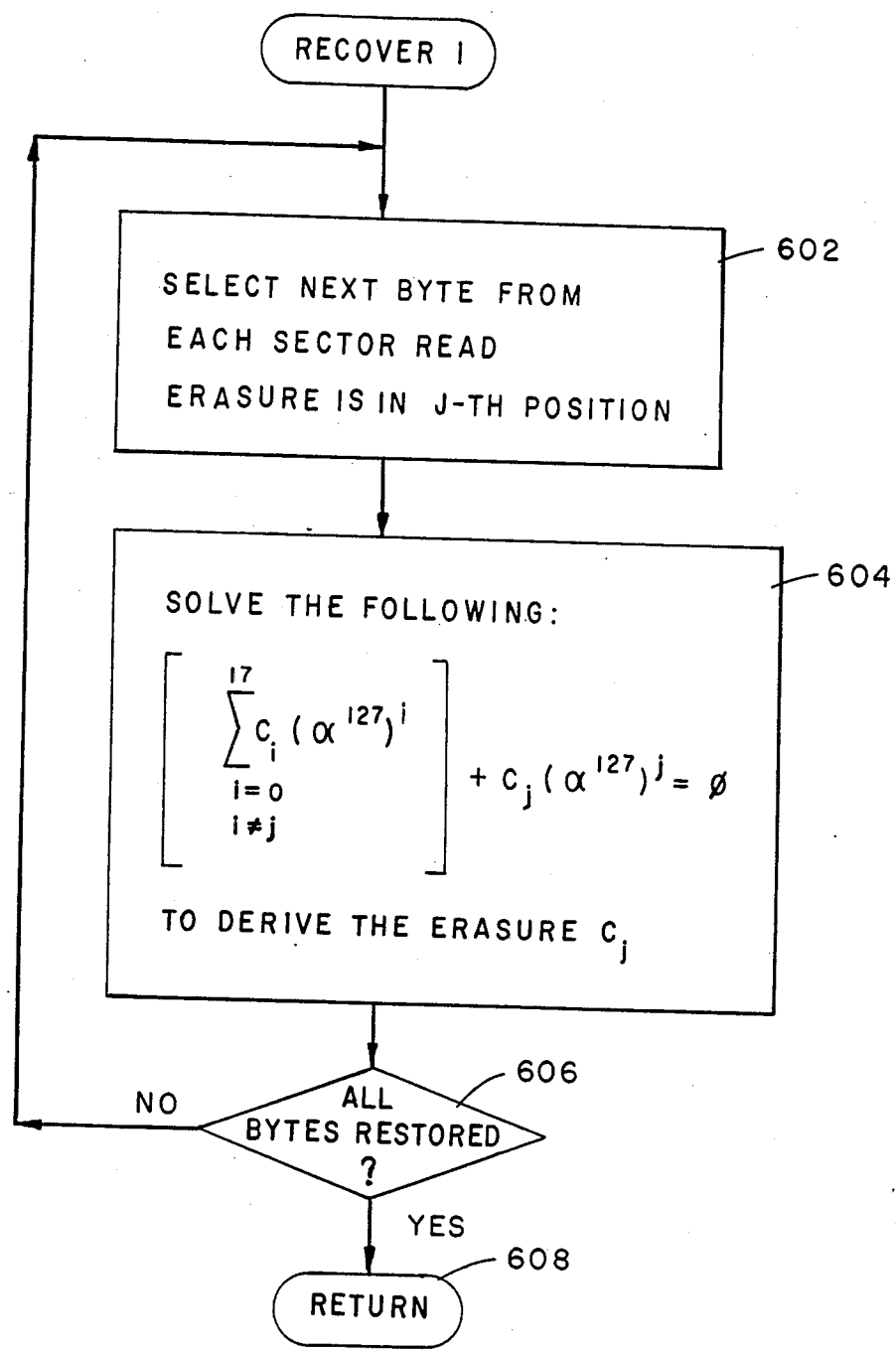
Figure 7:
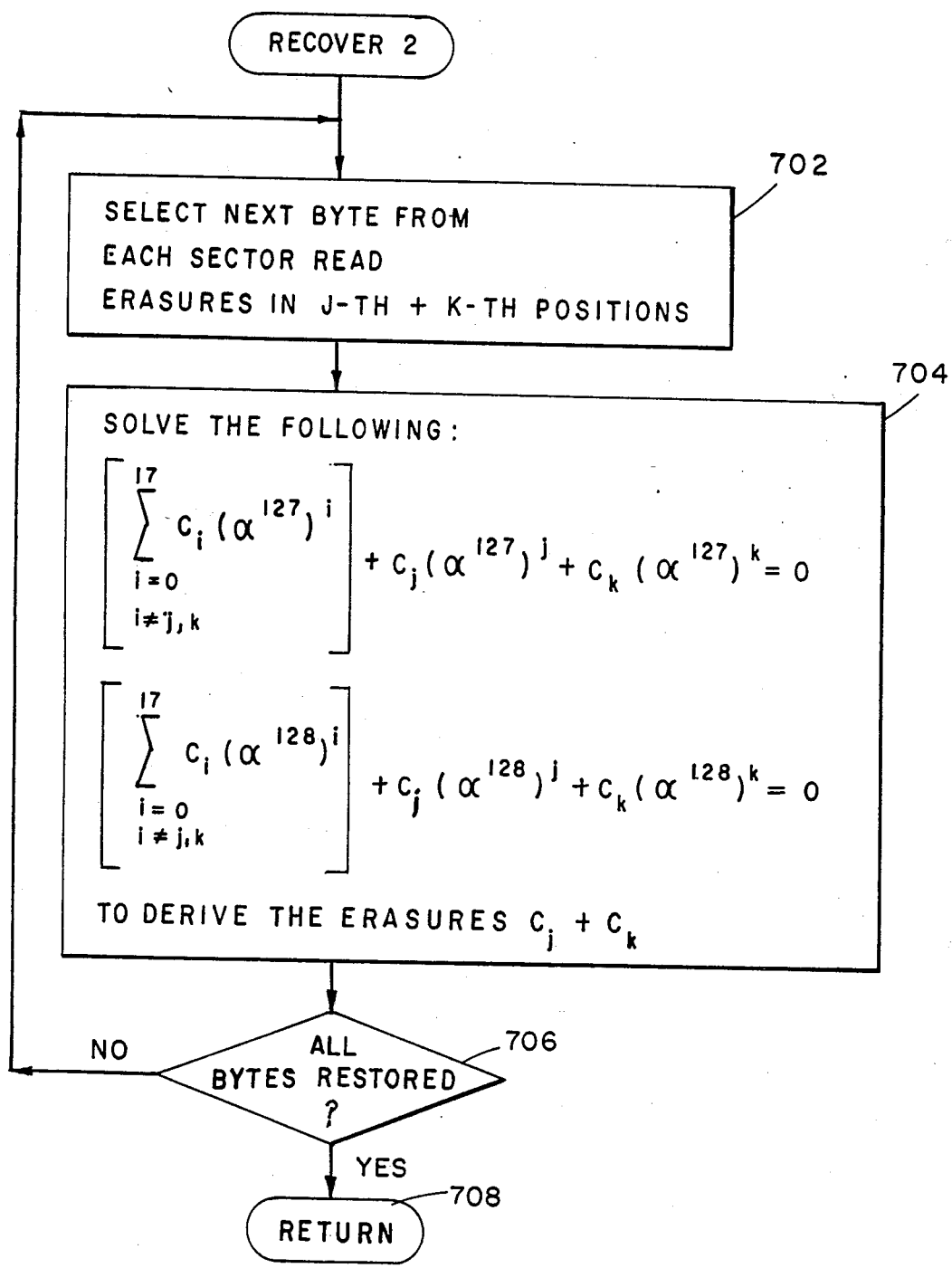

FIGS. 5-7 illustrate the program flow wherein the information is reread from the tape and restored to the disk. FIG. 5 illustrates the main control during the restoration or READ function and begins by reading 502 the next block of information, including sixteen data sectors and two ECC sectors, from the tape 12. A decision 504 is made to determine whether all eighteen sectors were read. If so, flow continues to block 506 wherein the data sectors are written to the disk; if not, an attempt is made to reread 508 all unread sectors. The attempt to reread can be made "in a gulp" or using an odd/even scheme to sequentially access the odd and even sectors. After the reread attempt is made, a decision 510 is made to again query whether all eighteen sectors have now been read. If so, the data sectors are written 506 to the disk; if not, a decision 512 is made to determine whether 16 or 17 sectors have been read. If so, the unread sectors can be restored using the Reed-Solomon code, which as disclosed herein will restore up to two erasures. In such a case, erasure correction is performed 514 by calling the appropriate restoration subroutine, and the data sectors are written 506 to the disk.

If sixteen or seventeen sectors are not read, a decision 516 is made to determine whether twelve attempts to reread have been made. If not, another attempt to reread 508 is made; if so, a decision 518 is made to determine whether this is the first twelve tries at a reread. If so, the tape is retensioned 520 and the reread loop beginning with block 508 is reinitiated. The tape is retensioned by transporting it first to one end of the tape, then to the opposite end of the tape, and finally returning the tape to the problem block. Frequently, this retensioning of the tape will enable the sectors to be read. If retensioning of the tape does not enable the sectors to be reread, the subroutine indicates that a failure 520 has occurred and that the data from the tape cannot be recovered. As indicated above, this failure mode has not yet been encountered in rather extensive testing of the present invention. However, if such failure were encountered, extraordinary measures could be taken to read the tape; or the backup information could possibly be recovered from yet another backup media.

The program flow to recover from a single erasure is illustrated in FIG. 6 and denominated RECOVER 1. Processing begins by selecting 602 the next byte from each sector read. One of the parameters passed to the RECOVER 1 subroutine is the location of the erasure, which is in the jth position. Processing continues by solving the following equation which has a single unknown—namely $c_j$:

$$\left[\sum_{\substack{i=0 \\ i \neq j}}^{17} c_i(q^{127})^i\right] + c_j(q^{127})^j = 0$$

The polynomial g(x) has roots at $q^{127}$ and $q^{128}$ in GF(256). Because the polynomial on the left side of the above equation is a multiple of g(x), this polynomial also has roots at $q^{127}$ and $q^{128}$. The summation term in the above equation is known because all of the $c_i$'s are bytes which can be read. Additionally, since q is a known primitive root, the expression $(q^{127})^i$ is also known. In the second term of the equation, the factor $(q^{127})^j$ is also known. Consequently, the single equation can be solved for the single unknown $c_j$ to derive the erased coefficient or missing data byte. After the byte has been recovered, a decision 606 is made to determine whether all 1024 bytes in the unreadable sector have been restored. If so, the subroutine returns 608 to block 514 in FIG. 5; if not, program flow returns to block 602 to continue the data restoration or erasure recovery.

The RECOVER 2 subroutine for restoring two unreadable or erased sectors is illustrated in FIG. 7. The subroutine begins by selecting 702 the next byte from each of the sixteen sectors which were read. The READ routine (FIG. 5) advises the RECOVER 2 subroutine of the location of the erasures, which are in the jth and kth positions. Program flow passes to block 704 wherein the following two equations are solved for the two unknowns $c_j$ and $c_k$:

$$\left[\sum_{\substack{i=0 \\ i \neq j,k}}^{17} c_i(q^{127})^i\right] + c_j(q^{127})^j + c_k(q^{127})^k = 0$$

$$\left[\sum_{\substack{i=0 \\ i \neq j,k}}^{17} c_i(q^{128})^i\right] + c_j(q^{128})^j + c_k(q^{128})^k = 0$$

The first summation term of each equation can be calculated because $c_i$ is known (i.e. has been successfully read) for all i not equal to j or k. Also, $q^{127}$ and $q^{128}$ are known. With regard to the second two terms of each equation, $(q^{127})^j$, $(q^{127})^k$, $(q^{128})^j$, and $(q^{128})^k$ are known. Consequently, the two equations include only two unknowns—namely $c_j$ and $c_k$—which is solved to produce the two erasures. After the two erased bytes are restored, a decision 706 is made to determine whether all 1024 bytes in each of the unrecovered sectors have been restored. If so, control returns 708 to block 514 in FIG. 5; if not, program flow returns to block 702 wherein the next two erasures are recovered.

Source code for implementing the flow charts illustrated in FIGS. 3-7 is attached hereto as appendix A. The source code is written in C language and will be readily understood and appreciated by those having ordinary skill in the programming art. This implementation is for GF(256) generated by the polynomial:

$$f(x) = x^8 + x^6 + x^5 + x + 1$$

The disclosed look-up table "log f[ ]" contains the primitive root logs of the ordered entries. For example, the log of the second entry, or 1, is 255; the log for the third entry, or 2, is 1; and so forth. The first entry is never accessed and therefore is arbitrarily given the value zero. The primitive root q of this field is binary 00000010. The look-up table "exp f[ ]" includes entries which are the powers of the primitive root q. For example, $q^0$ is 00000001; $q^1$ is 00000010; $q^2$ is 00000100; and so forth.

The described system and method for encoding and storing digital information on tape, and the resulting tape, comprise a significant enhancement of the reliability and recoverability of the stored information. The present invention also results in significant efficiencies, both in speed and physical tape space. A Reed-Solomon code utilizes relatively little tape space while providing full recoverability from up to two erasures in the sixteen corresponding data bytes. The tape format, wherein the error-correction sectors within a given block are stored adjacent the data sectors, eliminates the need for a mapping table and improves the efficiency and speed at which the back up and restoration functions can be performed.

The above description is that of a preferred embodiment of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A method of storing digital data words on a tape in a manner permitting recovery from erasures of certain stored data words, the method comprising:
    formatting the data words into a plurality of data sectors each having the same number of data words, each of the data words having no more than eight bits;
    formatting the data sectors into groups each having the same number of sectors;
    generating for each data sector group at least one error-correction sector of error-correction words each corresponding to one of the data words in each of the data sectors in the group, each error-correction word having no more than eight bits, said generating step including utilizing a Reed-Solomon code having a generator polynomial of $g(x)=x^2+q^{69}x+1$ where q is a primitive root of GF(256); and
    writing all data sectors and all error-correction sectors sequentially in any order on the tape as a block.

2. A method as defined in claim 1 wherein said writing step includes writing all of the error-correction sectors within each block at one end of the block.

3. A method as defined in claim 1 wherein said generating step includes generating sufficient error-correction sectors for each group in a manner to enable recovery from two erased data words.

4. A method as defined in claim 1 wherein:
    said formatting step includes formatting the data words into sixteen data sectors; and
    said generating step includes generating two error-correction sectors.

5. A method as defined in claim 1 wherein the tape comprises magnetic tape.

6. A method of storing data words on a magnetic tape comprising:
    arranging the data words into a plurality of sectors each having the same number of words, each data word including no more than eight bits;
    generating at least one error-correction sector of error-correction words having said same number of words, each error-correction word corresponding to one word in each of the data sectors, each error-correction word including no more than eight bits, said generating step including the utilization of a Reed-Solomon coding scheme, the generator polynomial for the Reed-Solomon code being $g(x)=x^2+q^{69}x+1$ where q is a primitive root of GF(256); and
    writing the data sectors and the error-correction sectors on the magnetic tape sequentially in any order as a block.

7. A method as defined in claim 6 wherein all of said steps are repetitively performed to create a plurality of the blocks on the magnetic tape.

8. A method as defined in claim 7 wherein said writing step includes writing all of the error-correction sectors at one end of the block.

9. A method as defined in claim 8 wherein said generating step includes generating error-correction sectors of sufficient quantity and quality to permit recovery from erasure of at least two corresponding data words.

10. A method as defined in claim 8 wherein:
    said formatting step includes formatting the data into sixteen data sectors; and
    said generating step includes generating two error-correction sectors.

11. A method as defined in claim 6 wherein said generating step includes generating the error-correction words using a look-up table.

12. A magnetic tape having digital information recorded thereon, said tape comprising:
    a plurality of tracks each extending substantially the full length of the tape;
    a plurality of sequentially arranged blocks on each of said tracks, each of said blocks including a plurality of sequentially arranged sectors, each of said sectors including a plurality of sequentially arranged digital words; and
    selected ones of said sectors within each block being data sectors and including only data words, others of said sectors within each block being error-correction sectors including only error-correction words each corresponding to one data word in each of said data sectors, each of the data words and the error-correction words including no more than eight bits, said corresponding error-correction words and data words being related by a Reed-Solomon code so that an erasure of one of the corresponding words can be restored based on the unerased words, the generator polynomial for the Reed-Solomon code being $g(x)=x^2+q^{69}x+1$ where q is a primitive root of GF(256).

13. A magnetic tape as defined in claim 12 wherein all error-correction sectors within each block are arranged sequentially at one end of the block.

14. A magnetic tape as defined in claim 12 wherein the corresponding error-correction and data words are related so that two of said erasures can be restored.

15. A magnetic tape as defined in claim 12 wherein each block includes sixteen data sectors and two error-correction sectors.

16. A tape having digital information recorded thereon, said tape comprising a plurality of sequentially arranged block areas each including a plurality of sector areas each including a plurality of digital words, selected ones of said sector areas each having a given number of data words stored thereon, the others of said sector areas each having the given number of error-correction words stored thereon, each of the data words and the error-correction words including no more than eight bits, each error-correction word corresponding to one data word in each of said sector areas, the error-correction words having been generated from the corresponding data words using a Reed-Solomon code enabling restoration of erasure of at least one data word, the generator polynomial for the Reed-Solomon code is $g(x)=x^2+q^{69}x+1$ where q is a primitive root of GF(256).

17. A tape as defined in claim 16 wherein said tape comprises magnetic tape.

18. A tape as defined in claim 16 wherein the sectors within each block are sequentially ordered on the tape, and further wherein the error-correction sector areas within each block are arranged at one end of the block.

19. A tape as defined in claim 16 wherein each block includes sixteen data sector areas and two error-correction sector areas.

20. A tape as defined in claim 16 wherein the data and error-correction words are generated enabling recovery from erasure of at least two data words.

* * * * *